(12) United States Patent
Nakamura et al.

(10) Patent No.: US 7,339,655 B2
(45) Date of Patent: Mar. 4, 2008

(54) ELECTRIC OPTICAL DISTANCE WAVELENGTH METER

(75) Inventors: Yutaka Nakamura, Ashigarakami-gun (JP); Hayami Kikawa, Ashigarakami-gun (JP)

(73) Assignee: Sokkia Co., Ltd., Atsugi-shi (JP)

(*) Notice: Subject to any disclaimer, the term of this patent is extended or adjusted under 35 U.S.C. 154(b) by 188 days.

(21) Appl. No.: 11/252,589

(22) Filed: Oct. 19, 2005

(65) Prior Publication Data
US 2006/0082758 A1 Apr. 20, 2006

(30) Foreign Application Priority Data
Oct. 20, 2004 (JP) .............. 2004-305709

(51) Int. Cl.
G01C 3/08 (2006.01)
(52) U.S. Cl. .............. 356/5.1; 356/5.11; 356/5.15; 356/5.01
(58) Field of Classification Search .............. 356/5.05
See application file for complete search history.

(56) References Cited

U.S. PATENT DOCUMENTS

2002/0044270 A1* 4/2002 Shirai et al. .............. 356/4.01
2005/0168719 A1* 8/2005 Stierle et al. .............. 356/4.01

FOREIGN PATENT DOCUMENTS

| JP | 1-213592 | 8/1989 |
|---|---|---|
| JP | 3177708 | 4/2001 |
| JP | 3236941 | 10/2001 |
| WO | WO 2004027452 A1 * | 4/2004 |

* cited by examiner

Primary Examiner—Thomas H. Tarcza
Assistant Examiner—Tim Brainard
(74) Attorney, Agent, or Firm—Westerman, Hattori, Daniels & Adrian, LLP.

(57) ABSTRACT

It is an object of the present invention to provide an electric optical distance wavelength meter detecting the time when the switching is completed and shortening the time required for distance measurement by immediately starting the distance measurement when measurement light and reference light are switched by a light path switching device. An electric optical distance wavelength meter includes a light emitting element for emitting measurement light toward a target placed on a measurement point; a light receiving element for receiving the measurement light coming back after reflecting on the target; a CPU for calculating the distance to the target or the object based on light receiving signals from the light receiving element; and a light path switching device for switching the measurement light so that the measurement light passes through an internal light path from the light emitting element to the light receiving element.

8 Claims, 5 Drawing Sheets

ELECTRIC OPTICAL DISTANCE WAVELENGTH METER

The present invention relates to an electric optical distance wavelength meter emitting measurement light toward a target, receiving the reflected light from the target and measuring the distance to the target.

BACKGROUND OF THE INVENTION

Figure 5:
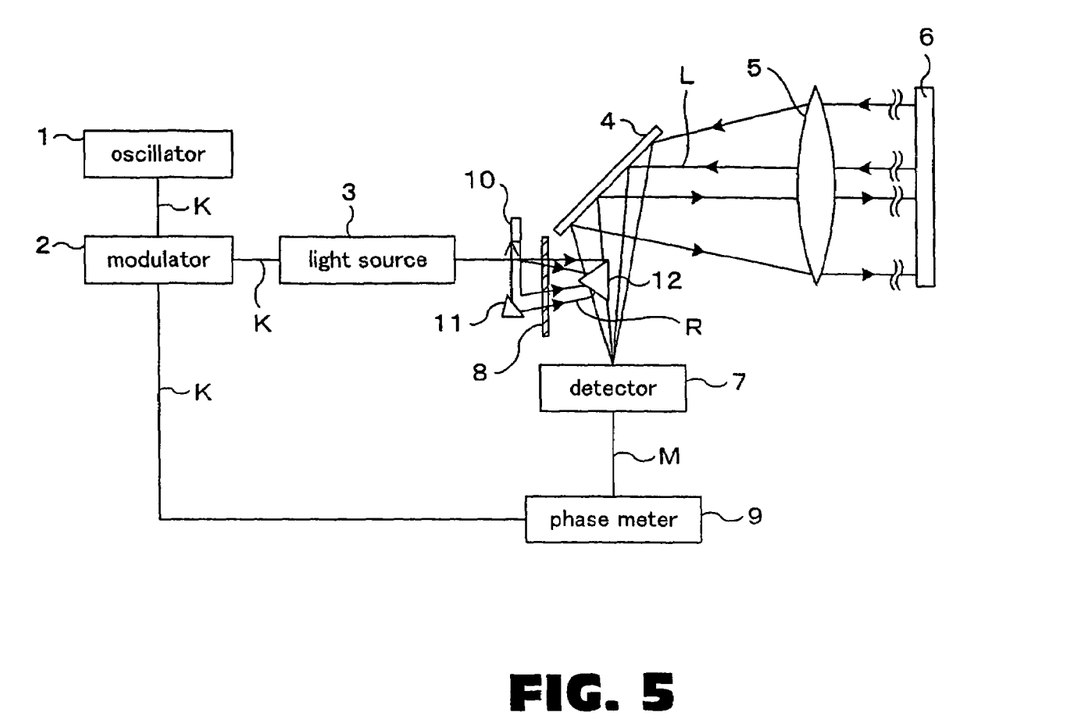
FIG. 5 is a block diagram of a conventional electric optical distance wavelength meter.

An electric optical distance wavelength meter of a phase difference system disclosed in Japanese Published Examined Patent Application No. 3236941 has been often used. FIG. 5 is a block diagram of the electric optical distance wavelength meter.

In the electric optical distance wavelength meter, measurement light L emitted from a light source 3 such as a laser diode is emitted toward a target (prism or the like) 6 placed on a measurement point through a light transmission optical system such as prisms 10, 12, a mirror 4 and an object lens 5. The light source 3 is connected to a modulator 2, and the modulator 2 is connected to a reference signal oscillator 1. The measurement light L is modulated by a reference signal K generated by the reference signal oscillator 1.

The measurement light L reflected on the target 6 is made incident to a detector (light receiving element) 7 such as a photo diode through a light reception optical system composed by the object lens 5 and the mirror 4. Then, the measurement light L is converted into an electric signal as a light receiving signal M by the detector 7. The mutual phase difference of the light receiving signal M and a reference signal K sent from the modulator 2 is measured by a phase meter 9, and a distance to the target 6 can be calculated by the phase difference.

When the above reference signal K has only one frequency, only the half length of the wavelength of the reference signal K can be measured. Consequently, the electric optical distance wavelength meter switches the frequency of the reference signal K sequentially to measure distance at a plurality of frequencies, and integrates the results of the measurements to measure the distance.

On the other hand, the measurement light L emitted from the light source 3 is immediately made incident to the detector 7 as reference light R through prisms 10, 11, and 12 by switching a light path switching device 8. When the distance is measured by using the reference light R as in the measurement light L, an error inherent to the electric optical distance wavelength meter can be known. Thus, the error inherent to the electric optical distance wavelength meter is corrected from the distance measured by using the measurement light L by measuring using the measurement light L and measuring using the reference light R alternately, and thereby the precise distance to the target 6 can be calculated.

In addition, the electric optical distance wavelength meter of a pulse traveling time system disclosed in Japanese Published Unexamined Patent Application No. H01-213592 to be described below has also been known. In the pulse traveling time system, pulse light is emitted toward the target, and the pulse light reflected from the target is received. The distance to the target is measured from the time for reciprocating to the target of the pulse light.

SUMMARY OF THE INVENTION

In the electric optical distance wavelength meter disclosed in Japanese Published Examined Patent Application No. 3236941, when the measurement light L and the reference light R have been switched by the light path switching device 8, the distance has not been measured during the time required for switching by assuming the sufficient time required for switching. For this reason, a problem has existed in that a time more than desired is required to measure the distance. The problem is similarly generated in the electric optical distance wavelength meter of the pulse traveling time system since the optical system has a light path switching means.

The present invention has been accomplished in view of the problems described above. It is an object of the present invention to provide an electric optical distance wavelength meter detecting the time when the switching is completed and shortening the time required for distance measurement by immediately starting the distance measurement when measurement light and reference light are switched by a light path switching device.

In order to solve the problems, in accordance with a first aspect of the present invention, an electric optical distance wavelength meter comprising: a light source for emitting measurement light toward a target placed on a measurement point or an object to be measured; a light receiving element for receiving the measurement light coming back after reflecting on the target or the object; a calculation processing part for calculating the distance to the target or the object based on a light receiving signal from the light receiving element; and a light path switching device for switching the measurement light so that the measurement light passes through an internal light path from the light source to the light receiving element, wherein the calculation processing part starts a usual distance measurement when an absolute value of a difference between the distance calculated immediately before or immediately after the switching signal of the light path switching device is sent out and the distance then calculated becomes a predetermined value or more at the time of switching the light path switching device.

In accordance with a second aspect of the present invention, an electric optical distance wavelength meter comprising: a light source for emitting measurement light toward a target placed on a measurement point or an object to be measured; a light receiving element for receiving the measurement light coming back after reflecting on the target or the object to detect the change of a light receiving signal; a sampling means for sampling the light receiving signal to obtain a sampling data; a storage means for storing the sampling data; a calculation processing part for calculating the distance to the target or the object from the sampling data stored by the storage means; and a light path switching device for switching the measurement light so that the measurement light passes through an internal light path from the light source to the light receiving element, wherein the calculation processing part repeats a sampling process for obtaining a sampling data containing at least one cycle of the light receiving signal and a distance calculation process for calculating a distance from the sampling data containing at least one cycle alternately at the time of switching the light path switching device, and the calculation processing part starts a usual distance measurement when an absolute value of a difference between a distance calculated immediately before or immediately after the switching signal of the light path switching device is sent out and the distance then calculated becomes a predetermined value or more.

In accordance with a third aspect of the present invention, there is provided an electric optical distance wavelength meter as set forth in the second aspect of the present invention, wherein the measurement light is modulated by a plurality of light transmission signals; a plurality of light receiving signals are acquired by the light receiving element; and each of the plurality of light receiving signals is sampled by the sampling means.

In accordance with a fourth aspect of the present invention, there is provided an electric optical distance wavelength meter as set forth in the second or third aspect of the present invention, wherein the light receiving signal is sampled by the sampling means after the frequency is lowered to an intermediate frequency signal by a frequency converter.

In accordance with a fifth aspect of the present invention, there is provided an electric optical distance wavelength meter as set forth in the first second, third or fourth aspect of the present invention, wherein the calculation processing part starts the usual distance measurement after the absolute value of a difference between the distance calculated immediately before or immediately after the switching signal of the light path switching device is sent out and the distance then calculated exceeds the predetermined value, and an absolute value of a difference between a distance previously calculated and the distance currently calculated is below a prescribed value.

In accordance with a sixth aspect of the present invention, there is provided an electric optical distance wavelength meter as set forth in the fifth aspect of the present invention, wherein the distance previously calculated is obtained by averaging a plurality of distances continuously calculated.

In accordance with a seventh aspect of the present invention, there is provided an electric optical distance wavelength meter as set forth in the first, second, third, fourth, fifth or sixth aspect of the present invention, the calculation processing part starts the usual distance measurement after elapse of the prescribed time after the switching signal of the light path switching device is sent out.

In accordance with an eighth aspect of the present invention, there is provided an electric optical distance wavelength meter as set forth in the first, second, third, fourth, fifth, sixth or seventh aspect of the invention, wherein the calculation processing part detects a change in scattering of the amplitude of the light receiving signal or the calculated distance, or the scattering of amplitude and the distance to determine the switching completion of the light path switching device, and starts the usual distance measurement.

The electric optical distance wavelength meter according to the first aspect of the present invention determines the completion of the switching of the light path switching device, and starts the usual distance measurement when the absolute value of a difference between the distance calculated immediately before or immediately after the switching signal transmission of the light path switching device is sent out and the distance then calculated becomes a predetermined value or more at the time of switching the light path switching device. Thereby, the completion of the switching of the light path switching device can be detected in an extremely short time, and the time required for the distance measurement can be remarkably reduced than that of the conventional device.

Also, the electric optical distance wavelength meter according to the second aspect of the present invention determines the completion of the switching of the light path switching device, and starts the usual distance measurement when the absolute value of a difference between the distance calculated immediately before or immediately after the switching signal transmission of the light path switching device is sent out and the distance then calculated becomes a predetermined value or more at the time of switching the light path switching device. Thereby, the completion of the switching of the light path switching device can be detected in an extremely short time, and the same effect as that of the second aspect of the present invention is exhibited.

Furthermore, the electric optical distance wavelength meter according to the third aspect of the present invention modulates the measurement light by using a plurality of light transmission signals. Thereby, the measurement is performed by using a plurality of light transmission signals at once, and the measurement time can be further reduced than that of the conventional electric optical distance wavelength meter for switching frequency sequentially.

Furthermore, the electric optical distance wavelength meter according to the fourth aspect of the present invention samples the light receiving signal by using the sampling means after the frequency is lowered to the intermediate frequency signal by the frequency converter. Thereby, the intermediate frequency signal having a low frequency can be stably amplified with a high gain, and a high S/N ratio is obtained by cutting the signals except the intermediate frequency signal. In addition, the time for sampling many times as much as possible within one cycle can be secured, and a highly precise measurement can be performed.

Furthermore, the electric optical distance wavelength meter according to the fifth aspect of the present invention starts the usual distance measurement after the absolute value of a difference between the distance calculated immediately before or immediately after the switching signal of the light path switching device is sent out and the distance then calculated becomes a predetermined value or more, and after the absolute value of a difference between the distance previously calculated and the distance currently calculated becomes a predetermined value or less, and the measured value is stabilized. Thereby, the time required for measuring the distance can be remarkably reduced, and a more highly precise measurement can be performed.

Furthermore, since the distance previously calculated is obtained by averaging a plurality of distances calculated continuously, the electric optical distance wavelength meter according to the sixth aspect of the present invention starts the usual distance measurement after the measured value is further stabilized. Thereby, the time required for measuring the distance can be remarkably reduced, and a more highly precise measurement can be performed.

Furthermore, the electric optical distance wavelength meter according to the seventh aspect of the present invention starts the usual distance measurement after elapse of the prescribed time after the switching signal of the light path switching device is sent out. Thereby, the distance measurement of the same accuracy can be performed at the same time as that of the conventional one even when the electric optical distance wavelength meters according to the first to sixth aspect of the present invention do not function for some reason.

Furthermore, the electric optical distance wavelength meter according to the eighth aspect of the present invention detects the change in scattering of the amplitude of the light receiving signal or the calculated distance, or the scattering of amplitude and the distance to determine the switching completion of the light path switching device, and starts the usual distance measurement. Thereby, the time required for measuring the distance can be remarkably reduced, and a more highly precise measurement can be performed.

DETAILED DESCRIPTION

Figure 1:
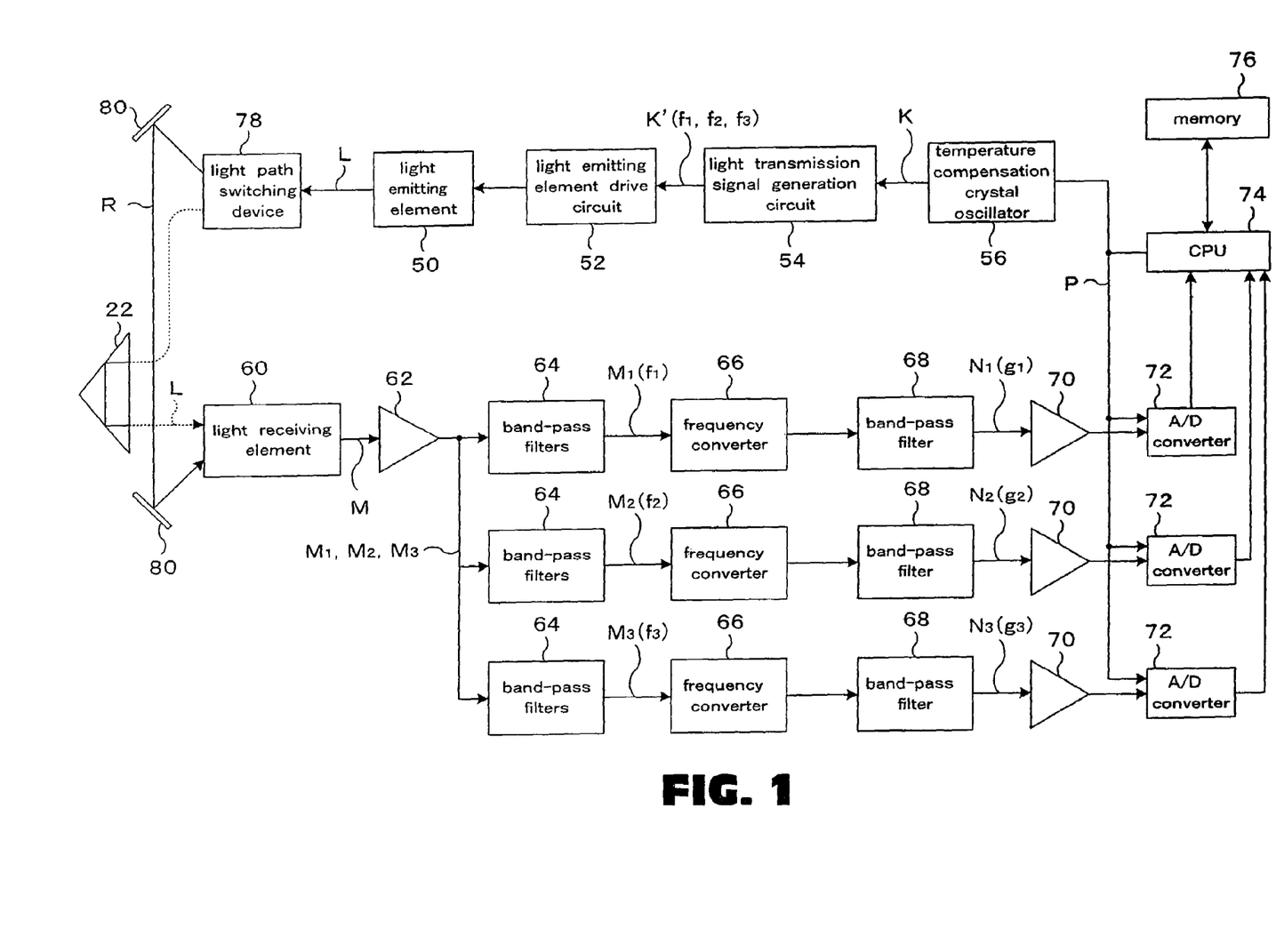
FIG. 1 is a block diagram of the electric optical distance wavelength meter.
Figure 2:
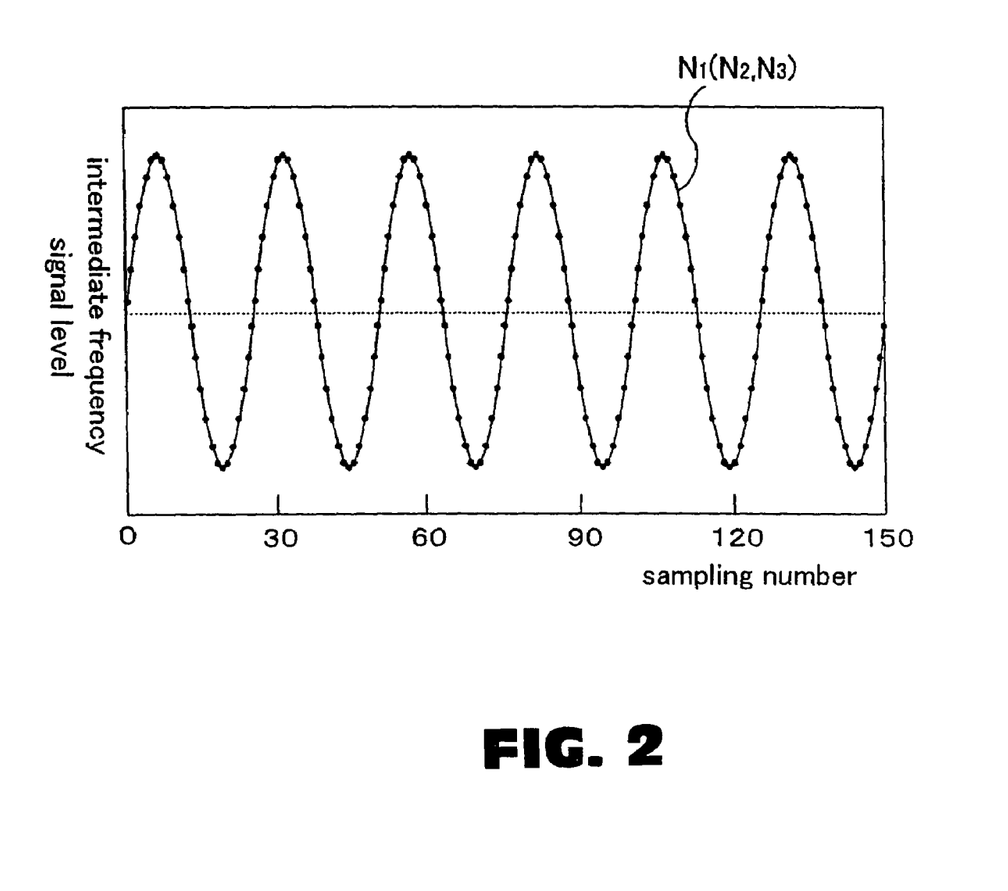
FIG. 2 is a diagram showing the state of sampling an intermediate frequency signal in the electric optical distance wavelength meter.
Figure 3:
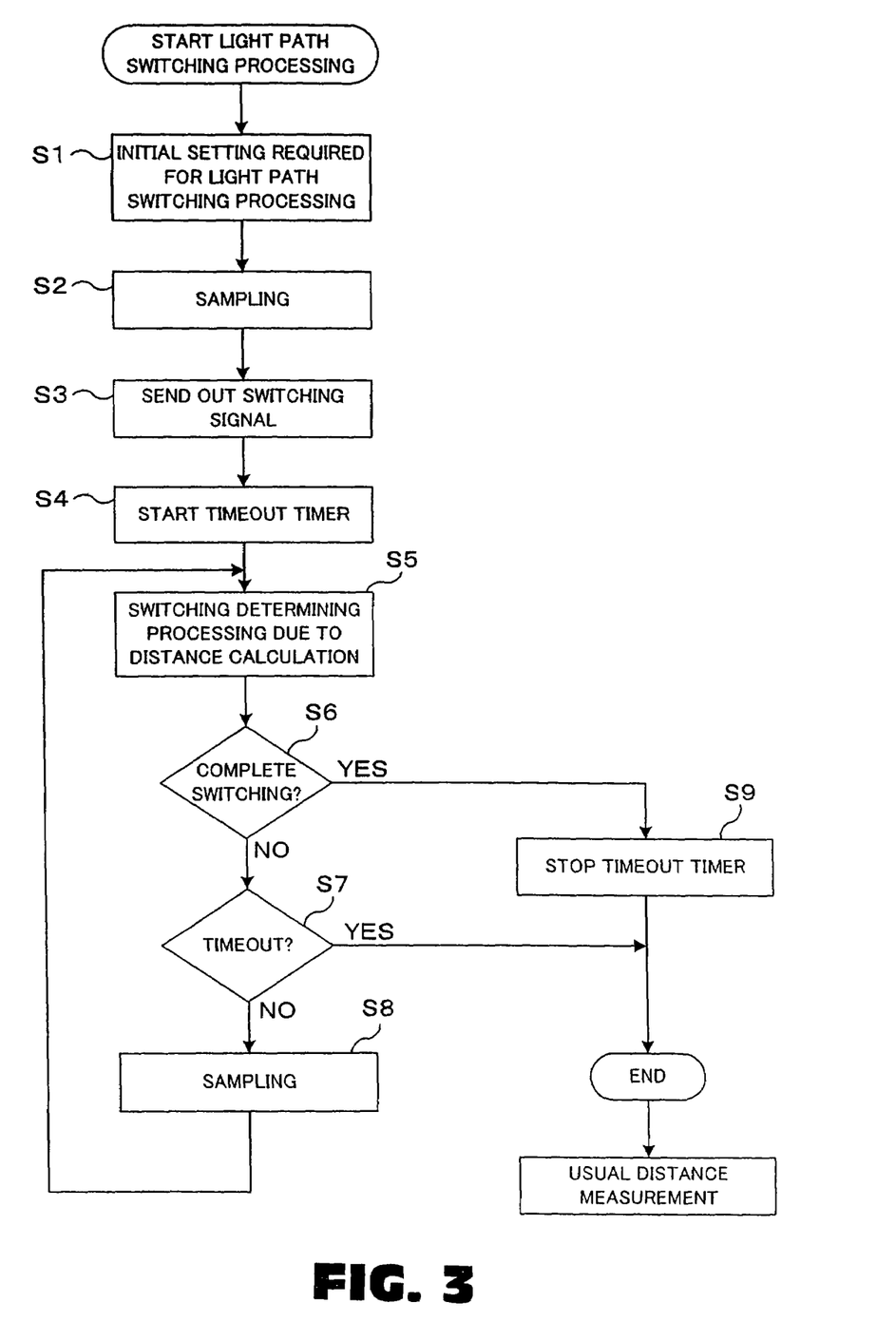
FIG. 3 is a flow chart showing the procedure of a light path switching processing for switching the light path of measurement light and reference light using a light path switching device in the electric optical distance wavelength meter.
Figure 4:
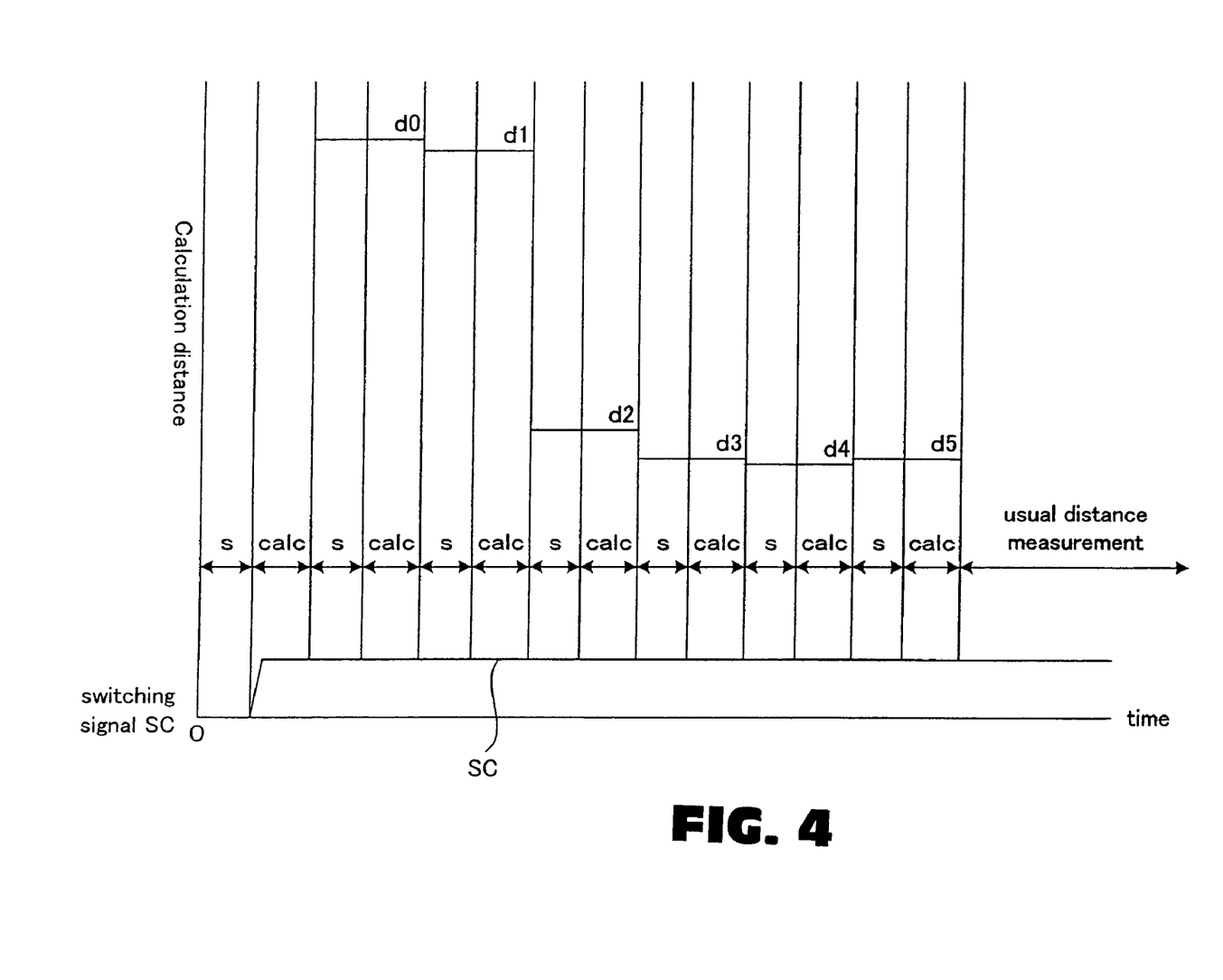
FIG. 4 is a view showing a principle detecting the time when the switching is completed when the measurement light and the reference light are switched by using the light path switching device.

Referring now to the drawings, an example of the electric optical distance wavelength meter according to the present invention will be described below. FIG. 1 is a block diagram of the electric optical distance wavelength meter. FIG. 2 is a diagram showing the state of sampling an intermediate frequency signal in the electric optical distance wavelength meter. FIG. 3 is a flow chart showing the procedure of a light path switching processing for switching the light path of measurement light and reference light using a light path switching device in the electric optical distance wavelength meter. FIG. 4 is a view showing a principle detecting the time when the switching is completed when the measurement light and the reference light are switched by using the light path switching device.

This electric optical distance wavelength meter is provided with a light emitting element 50 (light source) such as a laser diode emitting measurement light L. The light emitting element 50 is connected to a light emitting element drive circuit 52. The light emitting element drive circuit 52 is connected to a light transmission signal generation circuit 54. The light transmission signal generation circuit 54 is connected to a temperature compensation crystal oscillator 56. The temperature compensation crystal oscillator 56 is connected to a CPU 74. The temperature compensation crystal oscillator 56 always generates a reference signal K having a constant frequency at all times in spite of a change in temperature. The light transmission signal generation circuit 54 multiplies the reference signal K and generates a light transmission signal K' containing three frequencies f1, f2, and f3. The light emitting element drive circuit 52 modulates the measurement light L emitted from the light emitting element 50 at three frequencies f1, f2, and f3 using the light transmission signal K'. The measurement light L modulated thus is sent toward a target (prism or the like) 22 placed on a measurement point through a light transmission optical system (not shown).

The measurement light L reflected on the target 22 is made incident to a light receiving element 60 such as a photo diode through a light reception optical system (not shown). Then, after a light receiving signal M output from the light receiving element 60 is amplified by an amplifier 62, the light receiving signal M outputted from the light receiving element 60 is divided into light receiving signals M1, M2, and M3 of three frequencies f1, f2, and f3 by three band-pass filters 64. The frequencies of three light receiving signals M1, M2, and M3 are respectively lowered to intermediate frequency signals N1, N2, and N3 of intermediate frequencies g1, g2, and g3 by a frequency converter 66. The frequency converter 66 multiplies a local oscillation signal generated by a local oscillator and the light receiving signals M1, M2, and M3 using a mixer. Only the intermediate frequency signals N1, N2, and N3 are taken out by classifying only the intermediate frequencies g1, g2, and g3 as the difference between the frequency of the local oscillation signal and frequencies f1, f2, and f3 of the light receiving signals M1, M2, and M3 using band-pass filters 68. The intermediate frequency signals N1, N2, and N3 are amplified by an intermediate frequency amplifier 70. The intermediate frequency signal N is converted into a digital signal by sampling the intermediate frequency signals N1, N2, and N3 according to a synchronous signal P sent from the temperature compensation crystal oscillator 56 using an A/D converter 72 as a sampling means. The digital signal is input into the CPU 74 (calculation processing means), and is stored in a memory (storage means) 76.

Herein, the light receiving signals M1, M2, and M3 are converted into the intermediate frequency signals N1, N2, and N3 so that intermediate frequencies g1, g2, and g3 of a low frequency can be stably amplified with a high gain; a high S/N ratio is obtained by cutting the signals except the intermediate frequency signals N1, N2, and N3; and a highly precise measurement is performed by securing the time for sampling many times as much as possible with a sufficient time for one cycle. Of course, the sampling can be directly performed without converting the light receiving signals M1, M2, and M3 into the intermediate frequency signal when the sampling frequency can be set sufficiently high.

As shown in FIG. 2, when the distance is measured, the A/D converter 72 samples the intermediate frequency signals N1, N2, and N3 continuously for many cycles, and stores the sampling data in the memory 76. The CPU 74 calculates an initial phase to the synchronous signal P of each of the intermediate frequency signals N1, N2, and N3 from the sampling data. When three initial phases can be calculated, the distance to the target 22 is calculated by synthesizing the three initial phases.

On the other hand, the measurement light L emitted from the light emitting element 50 is made incident to the light receiving element 60 immediately as reference light R passing through an internal light path of the electric optical distance wavelength meter formed from the mirror 80 by the light path switching device 78. When the distance is measured by using the reference light R as in the measurement light L, an error inherent to the electric optical distance wavelength meter can be known. Then, the error inherent to the electric optical distance wavelength meter is corrected from the distance measured using the measurement light L by measuring using the measurement light L and measuring using the reference light R alternately, and a precise distance to the target 22 can be calculated.

In the example, as shown in the procedure of the light path switching processing of the light path switching device 78 to be described below, when the light path switching device 78 is switched to the measurement light L and the reference light R, and the completion of the light path switching is detected without waiting for sufficient time required for the completion of the light path switching as in the conventional procedure, the distance measurement is immediately started and the time required for the distance measurement is shortened. Next, the procedure of the light path switching processing of the light path switching device 78 will be described in detail by using FIG. 3 and FIG. 4.

When the light path switching processing is started, the CPU 74 operates the electric optical distance wavelength meter as follows. First, in a step S1, an initial setting processing required for light path switching processing is performed. Next, in a step S2, sampling data of the short time containing at least one cycle for the intermediate frequency signal N1, N2, and N3 is obtained. Next, in a step S3, a switching signal SC is sent out to the light path switching device 78. Next, in a step S4, a timeout timer is started. The timeout timer determines the completion of the light path switching when elapsing a sufficient time after the switching signal SC is sent out.

Next in a step S5, a processing required for determining the completion of the switching of the light path switching device 78 is performed. That is, first, the distance $d_0$ immediately before the switching signal SC of the light path switching device 78 is sent out by using the sampling data of the short time containing at least one cycle sampled at the step S2 is calculated. Then, as described below, a distance $d_n$ (n=1, 2, 3 . . . ) is calculated by using the sampling data of the short time containing at least one cycle sampled in a step S8. When the distance $d_0$ or $d_n$ is calculated, the method to be described below determines whether the switching of the light path switching device 78 is completed in a step S6. When the method determines the completion of the switching, the timeout timer is turned off in a step S9, and the light path switching processing is ended. Then, a usual distance measurement, that is, the distance measurement is performed at a high degree of accuracy by using the sampling data of many cycles of the intermediate frequency signals N1, N2, and N3.

When the method determines that the switching is not completed in the step S6, the method determines whether the timeout timer times out in a step S7. Herein, if the timeout timer times out, the light path switching processing is ended, and the usual distance measurement is then performed.

When the timeout timer does not time out in the step S7, the sampling of the short time containing at least one cycle for the intermediate frequency signals N1, N2, and N3 is performed in the step S8, and the method returns to the step S5. Until the method determines the completion of the switching the light path switching device 78, or the timeout timer detects the timeout, the method repeats the steps S5 to S8.

As shown in FIG. 4, for the intermediate frequency signals N1, N2, and N3, a sampling process S for obtaining the sampling data of at least one cycle and a distance calculation process calc using the sampling data are alternately performed by repeating the steps S5 to S8. Whenever the method makes a round of the steps S5 to S8, the method calculates the distances $d_1$, $d_2$, $d_3$, $d_{n-1}$, $d_n$, . . . in the step S5, determines whether the method determines the completion of the switching in the step S6.

A method for determining the completion of the switching in the step S6 will be described below. First, when the light path switching processing is start, the distance $d_0$ immediately before the switching signal SC of the light path switching device 78 is sent out is measured. Then, whenever the n times distance $d_n$ is calculated after sending out switching signal SC, the comparison of the distance $d_0$ immediately before the switching signal SC of the light path switching device 78 is sent out, the previous distance $d_{n-1}$ and the current distance $d_n$, that is, $|d_{n-1}-d_0|$ and $|d_{n-1}-d_n|$ are calculated. It is investigated whether $|d_{n-1}-d_0| \geq Dx$ (1) and $|d_{n-1}-d_n| \leq Ex$ (2) are satisfied or not. Herein, Dx of the Ex mean the constant obtained from the experiment.

As shown in FIG. 4, when the measurement is performed by the measurement light L reciprocating to the target 22, first the distance $d_0$ to the target 22 is calculated by the distance calculation process calc of the step S5 using the data sampled in the step S2. Since it takes much time until the shutter of the light path switching device 78 is completely moved after sending out the switching signal SC in the step S3, the distance $d_1$ to the target 22 is firstly calculated by the measurement light L. Next, when the shutter of the light path switching device 78 is completely moved before the sampling start of the step S8 or during the sampling process S, the distance is measured by the reference light R, and the calculation distance $d_2$ is greatly changed. For this reason, in a case where Dx of the formula (1) is appropriately set, it can be determined that the switching of the light path switching device 78 has been completed when the formula (1) was satisfied.

In order to detect the completion of the switching of the light path switching device 78 more precisely, referring to the distance calculated several times after the formula (1) is satisfied, after confirming that the formula (2) is satisfied, it is preferable to determine that the switching of the light path switching device 78 is completed. Herein, in order to detect the completion of the switching more precisely, it is more preferable to average a plurality of calculation distances $d_{n-1}$, $d_{n-2}$, $d_{n-3}$ as $d_{n-1}$ in the formula (2).

Thus, when the completion of the switching of the light path switching device 78 is detected by determining the completion of the switching of the light path switching device 78 from the calculation distances $d_0$, $d_{n-1}$, $d_n$, or detecting the timeout by the timeout timer, the light path switching processing is ended. The usual distance measurement is then performed.

The electric optical distance wavelength meter of the example emits the measurement light modulated simultaneously at a plurality of frequencies, and measures the distance whenever the sampling data of at least one cycle is obtained when the light path switching device 78 is switched. Also, the electric optical distance wavelength meter compares the distance $d_{n-1}$ obtained from the previous sampling data of at least one cycle, the distance $d_n$ obtained from the current sampling data of at least one cycle, and the distance $d_0$ obtained from the sampling data of at least one cycle immediately before the switching signal SC of the light path switching device 78 is sent out to detect the completion of the switching of the light path switching device 78. Thereby, the completion of the switching of the light path switching device 78 can be detected in a period of time extremely shorter than that of the conventional electric optical distance wavelength meter disclosed in the patent reference 1 or 2, and the time required for the distance measurement can be remarkably reduced.

The present invention is not limited to the example, and various changes can be made. For example, though the present invention is applied to the electric optical distance wavelength meter of the phase difference system in the example, the present invention can also be applied to the electric optical distance wavelength meter of the pulse traveling time system.

In the example, the sampling data sampled immediately before switching signal SC of the light path switching device 78 is sent out is used, and the distance $d_0$ is calculated immediately after switching signal SC of the light path switching device 78 is sent out. When the absolute value of a difference between the distance $d_0$ and distance $d_n$ then calculated becomes a predetermined value or more, the usual distance measurement is started. However, the distance $d_o$ may be calculated immediately after sampling immediately after the switching signal SC of the light path switching device 78 is sent out, when the absolute value of a difference between the distance $d_o$ and distance $d_n$ then calculated becomes a predetermined value or more, the usual distance measurement may be started. Since the shutter of the light path switching device 78 is hardly moved immediately after and immediately before switching signal SC of the light path switching device 78 is sent out, the distance $d_1$ may be calculated by using the sampling data sampled immediately after the switching signal SC of the light path switching device 78 is sent out. When the absolute value of a difference between the distance $d_1$ and distance $d_n$ then calculated becomes a predetermined value or more, the usual distance measurement may be started.

Though the sampling process S for obtaining the sampling data of at least one cycle and distance calculation process calc using the sampling data are alternately performed in the example, the time of the sampling process may be suitably changed so that the sampling process S obtaining the sampling data of several cycles and the distance calculation process calc using the sampling data of several cycles are alternately performed.

The completion of the switching of the light path switching device 78 may be determined with high precision by detecting the change in scattering of the amplitude of the light receiving signal M or scattering of the calculated distance $d_n$, or the amplitude of the light receiving signal M and the variation of the calculated distance.

In addition, though the measurement light L is simultaneously modulated by a plurality of light transmission signals K' in the example, the measurement light L may be sequentially modulated by a plurality of light transmission signals K'.

The present invention can be widely used for not only the electric optical distance wavelength meter but also survey equipment containing the electric optical distance wavelength meter, for example, a total station and the other distance measuring devices or the like.

The invention claimed is:

1. An electric optical distance wavelength meter comprising;
    a light source for emitting measurement light toward a target placed on a measurement point or an object to be measured;
    a light receiving element for receiving the measurement light coming back after reflecting on the target or the object;
    a calculation processing part for calculating the distance to the target or the object based on a light receiving signal from the light receiving element; and
    a light path switching device for switching the measurement light so that the measurement light passes through an internal light path from the light source to the light receiving element,
    wherein the calculation processing part starts a usual distance measurement when an absolute value of a difference between the distance calculated immediately before or immediately after the switching signal of the light path switching device is sent out and the distance then calculated becomes a predetermined value or more at the time of switching the light path switching device.

2. An electric optical distance wavelength meter comprising:
    a light source for emitting measurement light toward a target placed on a measurement point or an object to be measured;
    a light receiving element for receiving the measurement light coming back after reflecting on the target or the object to detect the change of a light receiving signal;
    a sampling means for sampling the light receiving signal to obtain a sampling data;
    a storage means for storing the sampling data;
    a calculation processing part for calculating the distance to the target or the object from the sampling data stored by the storage means; and
    a light path switching device for switching the measurement light so that the measurement light passes through an internal light path from the light source to the light receiving element,
    wherein the calculation processing part repeats a sampling process for obtaining a sampling data containing at least one cycle of the light receiving signal and a distance calculation process for calculating a distance from the sampling data containing at least one cycle alternately at the time of switching the light path switching device, and the calculation processing part starts a usual distance measurement when an absolute value of a difference between a distance calculated immediately before or immediately after the switching signal of the light path switching device is sent out and the distance then calculated becomes a predetermined value or more.

3. The electric optical distance wavelength meter according to claim 2, wherein the measurement light is modulated by a plurality of light transmission signals; a plurality of light receiving signals are acquired by the light receiving element; and each of the plurality of light receiving signals is sampled by the sampling means.

4. The electric optical distance wavelength meter according to claim 2 or 3, wherein the light receiving signal is sampled by the sampling means after the frequency is lowered to an intermediate frequency signal by a frequency converter.

5. The electric optical distance wavelength meter according to claim 4, wherein the calculation processing part starts the usual distance measurement after the absolute value of a difference between the distance calculated immediately before or immediately after the switching signal of the light path switching device is sent out and the distance then calculated exceeds the predetermined value, and an absolute value of a difference between a distance previously calculated and the distance currently calculated is below a prescribed value.

6. The electric optical distance wavelength meter according to claim 5, wherein the distance previously calculated is obtained by averaging a plurality of distances continuously calculated.

7. The electric optical distance wavelength meter according to claim 6, wherein the calculation processing part starts the usual distance measurement after elapse of the prescribed time after the switching signal of the light path switching device is sent out.

8. The electric optical distance wavelength meter according to claim 7, wherein the calculation processing part detects a change in the amplitude of the light receiving signal or variation of the calculated distance, or the amplitude and the distance variation to determine the switching completion of the light path switching device, and starts the usual distance measurement.

* * * * *